(12) United States Patent
Tenback et al.

(10) Patent No.: US 12,230,054 B2
(45) Date of Patent: Feb. 18, 2025

(54) DETERMINING DISPLAY ZOOM LEVEL

(71) Applicant: KONINKLIJKE PHILIPS N.V., Eindhoven (NL)

(72) Inventors: Marco Tenback, Wedde (NL); Siebrand Leen De Vries, Drachten (NL); Robert Machiel Blaakmeer, Nes (NL); Michel Van Es, Groningen (NL); Ramachandra Rao Ganesh, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 158 days.

(21) Appl. No.: 17/921,661

(22) PCT Filed: Apr. 29, 2021

(86) PCT No.: PCT/EP2021/061209
§ 371 (c)(1),
(2) Date: Oct. 27, 2022

(87) PCT Pub. No.: WO2021/228560
PCT Pub. Date: Nov. 18, 2021

(65) Prior Publication Data
US 2023/0171370 A1   Jun. 1, 2023

(30) Foreign Application Priority Data
May 12, 2020   (EP) .................................... 20174074

(51) Int. Cl.
*G06V 40/16*   (2022.01)
*G06F 3/01*   (2006.01)
(Continued)

(52) U.S. Cl.
CPC ............ *G06V 40/161* (2022.01); *G06F 3/012* (2013.01); *G06F 3/017* (2013.01); *G06T 7/74* (2017.01);
(Continued)

(58) Field of Classification Search
None
See application file for complete search history.

(56) References Cited

U.S. PATENT DOCUMENTS

| | | | |
|---|---|---|---|
| 2009/0295832 | A1 | 12/2009 | Takatsuka et al. |
| 2014/0306883 | A1 | 10/2014 | Yuan |

(Continued)

FOREIGN PATENT DOCUMENTS

| | | |
|---|---|---|
| JP | 2007324893 A | 12/2007 |
| WO | 2019036866 A1 | 2/2019 |

OTHER PUBLICATIONS

Oliver N et al., "Lafter: a real-time face and lips tracker with facial expression recognition", Pattern Recognition, Elsevier, GB, vol. 33, No. 8, Aug. 1, 2000 (Aug. 1, 2000), pp. 1369-1382, XP004321209, ISSN: 0031-3203, DOI: 10.1016/S0031-3203(99)00113-2, sections 3-6; figures 2-4, 7.

(Continued)

*Primary Examiner* — Talha M Nawaz

(57) ABSTRACT

In an embodiment, a computer-implemented method (100) is described. The method comprises identifying (102) a specified facial gesture from imaging data of a user. The method further comprises determining (104) whether the specified facial gesture is indicative of a specified zoom level to be used for displaying the user's face. In response to determining that the specified zoom level is to be used instead of a previously-determined zoom level used for displaying the user's face, a display showing a video feed of the user's face is caused to change a displayed size of at least (Continued)

a portion of the user's face on the video feed based on a difference between the specified zoom level and the previously-determined zoom level.

20 Claims, 5 Drawing Sheets

(51) Int. Cl.
　　　*G06T 7/73*　　　(2017.01)
　　　*G06V 10/10*　　(2022.01)
　　　*G06V 40/20*　　(2022.01)
　　　*H04N 5/262*　　(2006.01)

(52) U.S. Cl.
　　　CPC ............ *G06V 10/17* (2022.01); *G06V 40/171* (2022.01); *G06V 40/174* (2022.01); *G06V 40/20* (2022.01); *H04N 5/2628* (2013.01); *G06T 2207/30201* (2013.01)

(56) References Cited

U.S. PATENT DOCUMENTS

| 2015/0130846 | A1 | 5/2015 | Asano et al. |
| 2015/0154439 | A1 | 6/2015 | Anzue et al. |
| 2015/0207918 | A1 | 7/2015 | Lockman |
| 2016/0021316 | A1 | 1/2016 | Tsubusaki |
| 2018/0206658 | A1* | 7/2018 | Kim ..................... A45D 42/16 |
| 2019/0379822 | A1* | 12/2019 | Leong ................... G06F 3/012 |
| 2020/0374456 | A1* | 11/2020 | Kelly .................... H04N 23/66 |

OTHER PUBLICATIONS

Shaowei Chu: "Interacting with a Self-portrait Camera Using Gestures", Jan. 1, 2013 (Jan. 1, 2013), XP055823051, Retrieved from the Internet: URL:https://tsukuba.repo.nii.ac.jp/record/3115/files/DA06679.pdf [retrieved on Jul. 10, 2021].

International search report for patent application No. PCT/EP2021/061209 dated Jul. 22, 2021.

* cited by examiner

DETERMINING DISPLAY ZOOM LEVEL

CROSS-REFERENCE TO PRIOR APPLICATIONS

This application is the U.S. National Phase application under 35 U.S.C. § 371 of International Application No. PCT/EP2021/061209, filed on Apr. 29, 2021, which claims the benefit of European Patent Application No. 20174074.3, filed on May 12, 2020. These applications are hereby incorporated by reference herein.

FIELD OF THE INVENTION

The invention relates to a method, apparatus and tangible machine-readable medium for determining a display zoom level.

BACKGROUND OF THE INVENTION

A user attending to a personal care activity may use a mirror to assist them with this activity. The user may adjust their face positioning within a fixed frame of the mirror as appropriate when viewing themselves in the mirror. An emerging technology to assist with personal care activities is the so-called smart mirror. A smart mirror may provide enhanced visual information for the user in addition to the user's reflection or a representation of the user's reflection (e.g., on a display). This enhanced visual information may assist a user with a personal care activity such as healthcare monitoring, self-care (e.g., inspecting and maintaining oral hygiene, attending to skin care, applying make-up), grooming, and the like. In addition to smart mirrors, user devices that are capable of displaying a visual representation of a user such as a smart phone, tablet, smart watch, augmented reality glasses and/or any other device with a display may provide similar functionality to smart mirror technology (e.g., through the use of an imaging device such as an on-board device camera to acquire images of the user).

Some personal care activities may be difficult to perform using existing technology. For example, certain parts of a user's face or head may be difficult to see in a reflection or in a representation of the user's reflection in a display. A user may find it easier to perform certain personal care activities if they could be assisted in visualizing certain parts of their face or head.

SUMMARY OF THE INVENTION

Aspects or embodiments described herein relate to assisting a user in visualizing certain parts of their face or head. Aspects or embodiments described herein may obviate one or more problems associated with a user performing a personal care activity in front of a mirror or display for displaying a representation of the user's reflection.

In a first aspect, a method is described. The method is a computer-implemented method. The method comprises identifying a specified facial gesture from imaging data of a user. The method further comprises determining whether the specified facial gesture is indicative of a specified zoom level to be used for displaying the user's face. The method further comprises, in response to determining that the specified zoom level is to be used instead of a previously-determined zoom level used for displaying the user's face, causing a display showing a video feed of the user's face to change a displayed size of at least a portion of the user's face on the video feed based on a difference between the specified zoom level and the previously-determined zoom level.

Some embodiments relating to the first aspect are described below.

In some embodiments, identifying the specified facial gesture from the imaging data comprises identifying an orientation of the user's head relative to a baseline orientation. The identified orientation may be indicative of the specified zoom level to be used.

In some embodiments, identifying the specified facial gesture from imaging data of the user comprises tracking a position of the user's face relative to a reference point or axis to determine whether or not the user has performed the specified facial gesture. Tracking the position of the user's face relative to the reference point or axis may comprise comparing: a distance between a facial landmark and the reference point and/or an orientation of the user's head relative to the reference axis with a threshold indicative of a change to the specified zoom level to be used.

In some embodiments, the threshold for the orientation of the user's head is between 1 and 45 degrees for user's head yaw and between 1 and 45 degrees for the user's head pitch.

In some embodiments, determining the specified zoom level comprises determining whether or not a change in position of the user's face relative to the reference point or axis corresponds to the specified facial gesture indicative of the specified zoom level to be used.

In some embodiments, the reference point or axis corresponds to a: baseline yaw of the user's head; baseline pitch of the user's head; and/or baseline lateral offset of the user's head relative to an axis defined between the user's head and the display or an imaging device for acquiring the imaging data.

In some embodiments, the specified facial gesture comprises a change in yaw, pitch and/or lateral offset of the user's head relative to the baseline yaw, baseline pitch and/or baseline lateral offset, respectively.

In some embodiments, determining the specified zoom level to be used is based on the change in yaw, pitch and/or lateral offset of the user's head. The specified zoom level to be used may: change continuously depending on a difference between the yaw, pitch and/or lateral offset of the user's head relative to the baseline yaw, baseline pitch and/or baseline lateral offset, respectively; or change abruptly upon a difference between the yaw, pitch and/or lateral offset of the user's head relative to the baseline yaw, baseline pitch and/or baseline lateral offset, respectively, crossing a threshold value.

In some embodiments, the method comprises determining: a first specified zoom level to be used to ensure that the user's face is displayed in full on the display based on a dimension of the user's face, a distance between the user's face and an imaging device for acquiring the imaging data and/or a resolution of the display; and a second, increased, specified zoom level to be used to show at least the portion of the user's face upon identifying that the user has performed the specified facial gesture.

In some embodiments, the first and/or second specified zoom levels are calculated based on a resolution of the display and/or a specified fill factor defining a proportional area of the display to be used for displaying the user's face at the first and second specified zoom levels, such that an image quality metric is met for displaying the user's face on the display at both the first and second specified zoom levels.

In some embodiments, the method comprises causing the display showing the video feed of the user's face to show at least the portion of the user's face at the specified zoom level comprises determining, based on the identified specified facial gesture, that one of: the first and second specified zoom level is to be used instead of the other of: the first and second specified zoom level. The method may further comprise causing the display to show at least the portion of the user's face at the first or second specified zoom level to be used after a time delay.

In some embodiments, the method comprises causing an imaging device to acquire the imaging data.

In a second aspect, a tangible machine-readable medium is described. The tangible machine-readable medium stores instructions which, when executed by at least one processor, cause the at least one processor to implement the method according to the first aspect or any related embodiment.

In a third aspect, apparatus is described. The apparatus comprises processing circuitry. The processing circuitry comprises an identification module configured to identify a specified facial gesture from imaging data of a user. The processing circuitry further comprises a determining module configured to determine whether the specified facial gesture is indicative of a specified zoom level to be used for displaying the user's face. The processing circuitry further comprises a control module configured to, in response to a determination being made that the specified zoom level is to be used instead of a previously-determined zoom level used for displaying the user's face, cause a display showing a video feed of the user's face to change a displayed size of at least a portion of the user's face on the video feed based on a difference between the specified zoom level and the previously-determined zoom level.

An embodiment relating to the third aspect is described below.

In some embodiments, the apparatus further comprises the display and/or an imaging device for acquiring the imaging data.

These and other aspects of the invention will be apparent from and elucidated with reference to the embodiment(s) described hereinafter.

BRIEF DESCRIPTION OF THE DRAWINGS

Exemplary embodiments of the invention will now be described, by way of embodiment only, with reference to the following drawings, in which.

DETAILED DESCRIPTION OF THE EMBODIMENTS

Figure 1:
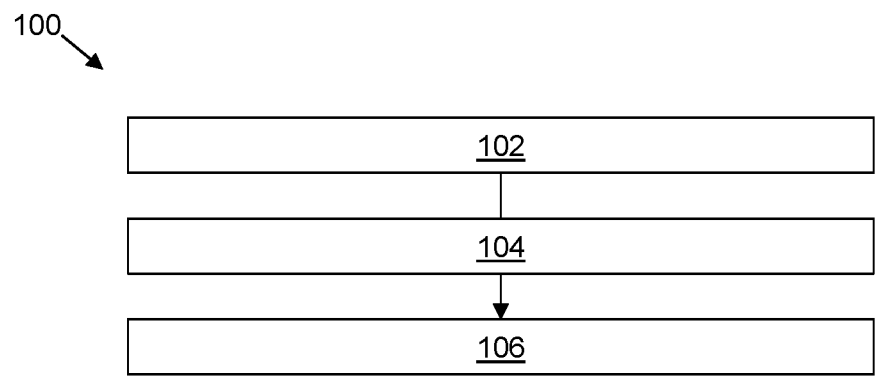
FIG. 1 refers to a method of determining a display zoom level according to an embodiment.

FIG. 1 shows a method 100 (e.g., a computer-implemented method) of determining a display zoom level according to an embodiment. For example, the method 100 may facilitate the determination of a certain zoom level for a display (e.g., a smart mirror or other device capable of displaying a visual representation of a user) to use when showing a representation of a user. Thus, depending on factors such as the display dimensions, user (e.g., facial) dimensions and user proximity to the display, the method 100 may determine whether or not the user is to be shown as magnified or de-magnified on the display. For example, if the display's dimensions are sufficiently large, an image of a user's may be magnified compared with the actual dimensions of the user's face. On the other hand, if the display's dimensions are less than the actual dimensions of the user's face, the image of the user's face may be shown as de-magnified on the display. As will be discussed in greater detail below, the determination of the zoom level for the display may be determined based on a user input. For example, a user input such as a facial gesture may be used to determine the zoom level for the display.

The method 100 comprises, at block 102, identifying a specified facial gesture from imaging data of a user. For example, the method 100 may be able to determine whether or not a movement of the user between frames of the imaging data corresponds to a recognizable facial gesture or cue of facial movement.

Facial tracking (e.g., using a face landmark detection algorithm) may be performed in order to detect movement of the user's face. This information regarding the user's facial movement may be analyzed to see whether or not it corresponds to a specified facial gesture. For example, the information regarding the user's facial movement may be input to a model (e.g., a machine learning model trained with image sequences of specified facial gestures) to identify whether or not the user's facial movement corresponds to a specified facial gesture.

In an example, a facial gesture may comprise the user moving their head with or without changing their facial expression. In another example, a facial gesture may comprise the user changing their facial expression with or without moving their head. In any case, the movement of the user's face due to moving their head and/or changing their facial expression may correspond to a specified facial gesture or other cue of facial movement.

In an example, a baseline facial position (e.g., corresponding to a baseline orientation of the user's head) may be defined with respect to an imaging device (e.g., for acquiring the imaging data of the user) and/or a display (e.g., for showing an image or other visual representation of the user's face). For example, the baseline facial position may be defined by the user's face being positioned so as to 'look' straight at the imaging device and/or the display with no yaw, pitch, roll and/or lateral offset of their head (e.g., a 'baseline orientation') relative to the imaging device and/or display. As described herein, a baseline orientation refers to a baseline yaw, pitch and lateral offset of the user's head with respect to the imaging device and/or the display.

In an example discussed in more detail below, a user may move their face by, for example, changing the yaw, pitch, roll and/or lateral offset of their head. Such movement of their face may be away from or towards the baseline facial position. In an example, movement of the user's face away from the baseline facial position by a certain change in yaw and/or pitch that exceeds a threshold may correspond to a 'specified' facial gesture. In another example, movement of the user's face towards the baseline facial position (e.g., from a position that previously exceeded the threshold) may correspond to a 'specified' facial gesture. In other similar words, a threshold yaw and/or pitch may be defined and if the facial movement is such that the threshold yaw and/or pitch is crossed, this movement may be regarded as a 'specified' facial gesture.

In some embodiments, identifying the specified facial gesture from the imaging data comprises identifying an orientation of the user's head relative to a baseline orientation. The identified orientation may be indicative of the specified zoom level to be used.

In an example, if the model indicates that the movement of the user's face corresponds to a specified facial gesture, this indication may be used to cause a certain change to the way in which the user's face is shown on a display or cause some other change to what information is presently shown on the display.

Not every movement of the user's face may correspond to a specified facial gesture. Thus, in an example, if the model indicates that the user has not performed a facial movement corresponding to a specified facial gesture, no change may be made to the way in which the user's face is shown on a display or what information is shown on the display.

The method 100 further comprises, at block 104, determining whether the specified facial gesture is indicative of a specified zoom level to be used for displaying the user's face. Thus, when the specified facial gesture is identified, a corresponding (i.e., specified) zoom level can be selected. The specified zoom level may be selected instead of a current zoom level (e.g., a previously-determined zoom level) currently used for displaying the user's face on a video feed.

For example, there may be a set of (e.g., predetermined) facial gestures and each facial gesture may be associated with a certain zoom level to be used if the user performs that facial gesture.

The method 100 further comprises in response to determining that the specified zoom level is to be used instead of a previously-determined zoom level used for displaying the user's face, causing, at block 106, a display showing a video feed of the user's face to change a displayed size of at least a portion of the user's face on the video feed based on a difference between the specified zoom level and the previously-determined zoom level.

Although other factors such as display resolution and user distance from the imaging device and/or display may affect what is an appropriate zoom level to use for the display, the specified zoom levels for the set of facial gestures may refer to comparative zoom levels. For example, the difference between a specified (baseline) zoom level for showing the user's face in the baseline facial position and a specified (magnified) zoom level for showing the user's face when the yaw and/or pitch of the user's head equals or exceeds a threshold may be related by a factor (e.g., the factor may refer to the ratio between the specified magnified and baseline zoom levels).

Thus, if the specified zoom level switches from the baseline zoom level to the magnified zoom level, the image to be shown by the display may be (further) magnified by the factor. Correspondingly, if the specified zoom level switches from the magnified zoom level to the baseline zoom level, the image to be shown by the display may be de-magnified by the factor.

The amount of the user's face shown on the display may depend on certain factors such as the specified zoom level, the resolution of the display, the user's actual facial dimensions and/or the distance between the user's face and the imaging device and/or display. In an example, the entire user's face may be shown on the display (for example, if the specified zoom level corresponds to the baseline facial position). In another example, a portion (i.e., part) of the user's face may be shown on the display (for example, if the specified zoom level is magnified compared with the zoom level specified for the baseline facial position).

By performing a specified facial gesture, the user may cause the display to automatically change the specified zoom level for the display, to change the displayed size of at least a portion of the user's face e.g., in order to assist the user with a personal care activity. There may be certain facial positions which may make it difficult for the user to see a certain part of their face. For example, if the user rotates their head relative to the baseline facial position (e.g., by changing the yaw and/or pitch of their head), this may correspond to a specified facial gesture which may cause the display to show a magnified version of at least a portion of the user's face. The magnified version of at least the portion of the user's face may make it easier for the user to see a certain part of their face, which may assist the user with a personal care activity.

In an example, the user's face may be shown as taking up 90% of the display size if the user's face is at the baseline facial position. At least a portion of the user's face (e.g., a 'facial zone') or head may be shown by the display if the specified zoom level is magnified. In some cases, this may mean that some of the user's face is not visible in the display because the portion of the user's face has been magnified. However, the user may find it easier to concentrate on the personal care activity if the display makes it easier for the user to see a portion of their face or head, which might otherwise be difficult to see without magnification.

Figure 2:
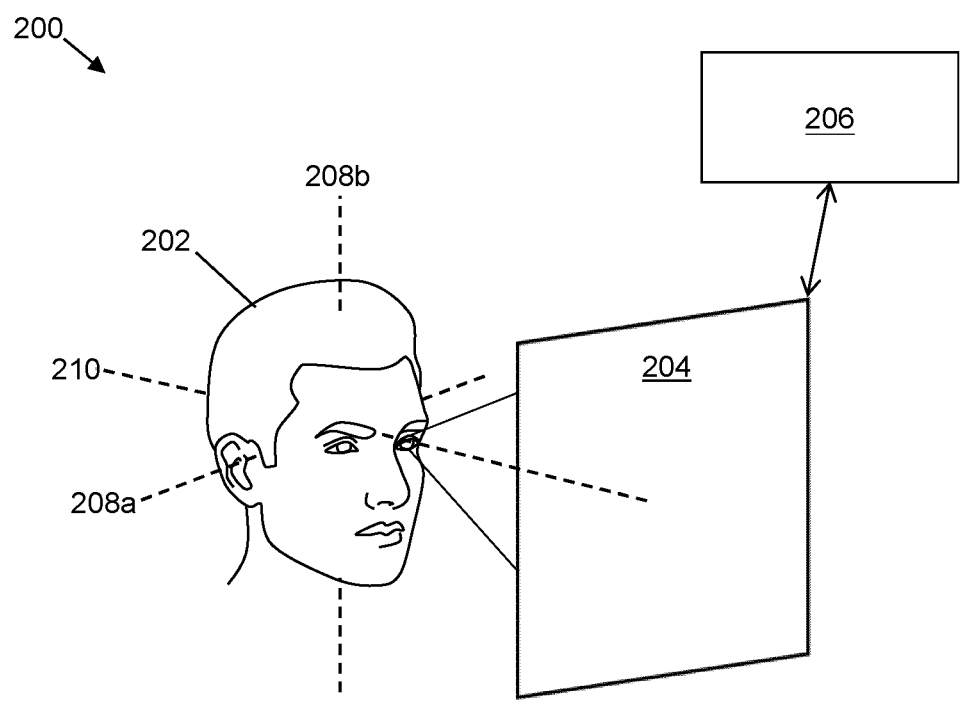
FIG. 2 is a schematic drawing of a system for assisting a user according to an embodiment.

FIG. 2 shows a system 200 for assisting a user 202 according to an embodiment. The system 200 comprises an apparatus 204 such as a smart mirror or other user device comprising a display (not shown) or other device capable of displaying a visual representation of the user 202. The apparatus 204 may comprise an on-board imaging device such as a selfie camera (not shown) for acquiring imaging data of the user 202. In FIG. 2, the user 202 is facing the apparatus 204 so that, in use, they would be facing the on-board imaging device, which acquires images of the user 202 to be shown on the display, as can been seen by the user 202.

The system 200 further comprises processing circuitry 206 for implementing certain methods described herein (e.g., the method 100 of FIG. 1 or any method described below). The processing circuitry 206 in FIG. 2 is a separate entity to the apparatus 204 itself For example, in FIG. 2, the processing circuitry 206 is implemented by an entity such as a server or cloud-based service. The apparatus 204 and the processing circuitry 206 are communicatively coupled in order to exchange data therebetween (e.g., so that the processing circuitry 206 may acquire imaging data from the apparatus 204 and/or provide an instruction to control what is shown on the display of the apparatus 204). In other embodiments, the processing circuitry 206 may be implemented by the apparatus 204 itself.

The user 202 may change the relative positioning of their head and the apparatus 204 in various ways. Two example head movement types are represented by first and second perpendicular axes 208a, 208b. Head rotation about the first axis 208a corresponds to the user changing the pitch of their head (i.e., moving their head up or down). A similar change in pitch effect may be observed by moving the apparatus 204 up and down relative to the user's face while keeping the apparatus 204 facing the user's head. Head rotation about the second axis 208b corresponds to the user changing the yaw of their head (i.e., turning their head left or right). A similar change in yaw effect may be observed by moving the apparatus 204 left or right relative to the user's face while keeping the apparatus 204 facing the user's head.

A further axis 210 perpendicular to a plane defined by the first and second axes 208a and 208b may be defined between the user's head and the display and/or the imaging device of the apparatus 204. In this example, the axis 210 extends perpendicularly from a center location on a plane defined by the apparatus 204 (e.g., the display of the apparatus 204 defines such a plane and the center of the display may refer to the center location). As shown by FIG. 2, the user 202 is in a 'baseline orientation' since they are facing the apparatus 204. In this regard, the baseline lateral offset of the user's head relative to the axis 210 is such that the center of the user's face is aligned with the axis 210.

Thus, if the user's head were to move sideways, up or down (i.e., a 'change in lateral offset') relative to the baseline lateral offset, the center of the user's face would no longer be aligned with the axis 210. In other similar words, the user 202 may move their head relative to the apparatus 204 within or parallel to the plane defined by the first and second axes 208a, 208b without changing the direction of facing of their head or the apparatus 204.

A further type of relative positioning includes 'roll' where the user 202 rotates their head about the further axis 210 and/or moves the apparatus 204 relative to their head to produce the same 'roll' effect.

From the perspective of the apparatus 204, any apparent change in the positioning of the user's head may appear as a change in pitch, yaw, roll and/or lateral offset of the user's head relative to the apparatus 204. When determining whether or not the user 202 has performed a specified facial gesture, the system 200 may take into account these various potential movement types to determine whether or not to cause a change to what is shown on the display of the apparatus 204.

Figure 3:
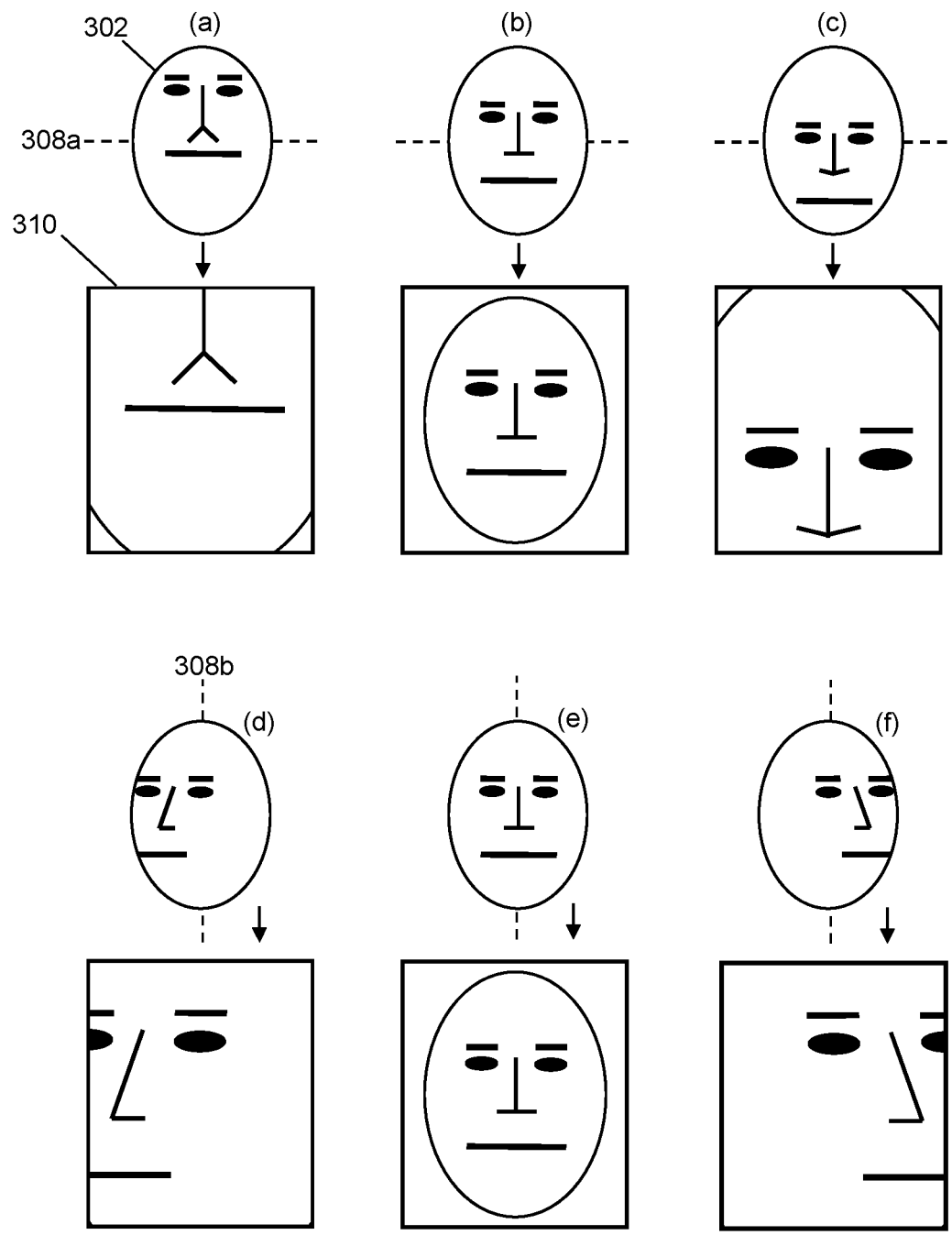
FIG. 3 is a schematic drawing of an apparatus for determining a display zoom level according to an embodiment.

FIG. 3 shows in more detail what is shown on a display 310 (e.g., of an apparatus such as apparatus 204 of FIG. 2) when a user 302 performs a specified facial gesture (e.g., by moving their head relative to the display 310).

FIGS. 3(a)-(c) show a user 302 changing the pitch of their head (by rotating their head about the first axis 308a). In FIG. 3(a) the user 302 has rotated their head up relative to the display 310 (e.g., to 'look upwards'). In FIG. 3(b) the user 302 is looking straight ahead at the display 310 (e.g., the 'baseline facial position'). In FIG. 3(c) the user 302 has rotated their head down relative to the display 310 (e.g., to 'look downwards'). In FIG. 3(b), the user 302 is shown in a magnified form on the display 310 (compared to their actual facial dimensions) and their entire face is visible in the display with most of the display 310 used for showing their face. In FIG. 3(a), the change to the pitch of the user's head is regarded as a 'specified facial gesture' such that the display 310 shows a zoomed-in view (i.e., further magnified) view of the user's face. In this example, only part of the user's face (i.e., their nose and mouth) is visible in the display 310 due to the level of magnification but in other examples, the display 310 may be sufficiently large and/or the level of magnification is different so that the entire user's face is substantially or completely visible on the display 310. A similar zoomed-in view is shown in FIG. 3(c) and only part of the user's face is visible (i.e., their eyes and nose). Returning to the facial position of FIG. 3(b) (i.e., from FIG. 3(a) or 3(c)) may be regarded as another 'specified facial gesture' such that the display 310 shows a comparatively zoomed-out view of the user's face.

FIGS. 3(d)-(f) show the user 302 changing the yaw of their head (by rotating their head about the second axis 308b). In FIG. 3(d) the user 302 has rotated their head to their right relative to the display 310. In FIG. 3(e) the user 302 is looking straight ahead at the display 310 (e.g., the 'baseline facial position'). FIG. 3(e) is the same as FIG. 3(b). In FIG. 3(f) the user 302 has rotated their head to their left relative to the display 310. In FIG. 3(d), the change to the yaw of the user's head is regarded as a 'specified facial gesture' such that the display 310 shows a zoomed-in view (i.e., further magnified) view of the left side of user's face (i.e., the user's left side). A similar zoomed-in view is shown in FIG. 3(f) with the right side of the user's face shown.

When the user 302 changes their facial position by a certain (e.g., threshold) amount of pitch and/or yaw relative to the baseline facial position, the display 310 shows a zoomed-in view of the user's face (or head) so that the user 302 may find it easier to carry out a personal care activity for that part of their face/head which might otherwise be difficult to see in the display 310. The zooming in/out is performed automatically by virtue of the user 302 changing their facial position and/or moving the display 310 relative to their face/head. This automatic zooming in/out functionality may therefore allow the user 302 to intuitively change what is shown on the display 310 without having to think about making any change to the display 310 settings. In other similar words, the user's facial movement to attend to a personal care activity at a difficult-to-see zone of their face or head may automatically cause the display 310 to change the zoom level so that the user 302 can more easily see that zone without having to provide any additional input to the display 310.

Figure 4:
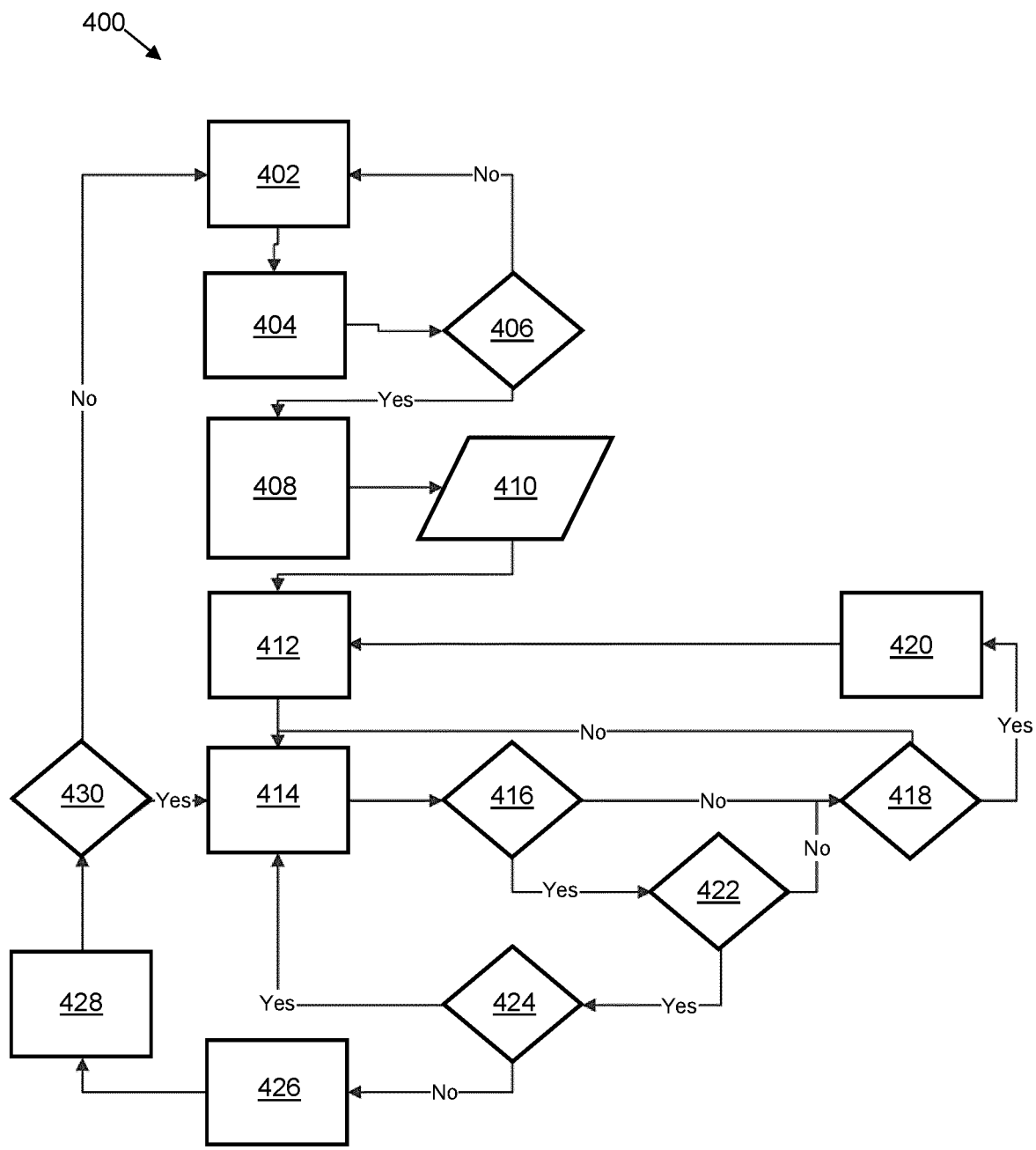
FIG. 4 refers to a method of determining a display zoom level according to an embodiment.

FIG. 4 refers to a method 400 of determining a display zoom level according to an embodiment. The method 400 may comprise features corresponding to the blocks 102 to 106 of FIG. 1 and may therefore refer to features described above in relation to FIG. 1. Similarly, any features described in relation to the system 200 of FIG. 2 and/or the apparatus of FIG. 3 may be referred to in the description of the method 400. Where appropriate, certain blocks of FIG. 4 may be omitted and/or certain blocks of FIG. 4 may be implemented in a different order to what is depicted by FIG. 4.

In some embodiments, at block 402 of the method 400, an imaging device such as an on-board camera of the apparatus (e.g., apparatus 204 of FIG. 2) or another imaging device (e.g., this could be a separate entity to the apparatus 204) is caused to acquire the imaging data. This imaging data may be in the form of a live feed of the user and/or may comprise a sequence of images of the user 202.

Upon acquiring the imaging data, the method 400 comprises, at block 404, detecting the user's face using facial detection and/or tracking (e.g., using a facial landmark detection algorithm) from the imaging data. If a face is not detected in the imaging data, at block 406 of the method 400, the method 400 may continue to monitor the imaging data (at block 402) until a face is detected.

However, once a face is detected at block 406, the method 400 proceeds to block 408 where measurements of the user's facial dimensions are determined from the imaging data. For example, the height and/or width of the user's face may be determined from the imaging data. Such information may be used to determine the distance between the user's face and the imaging device.

Therefore, in an example, if the user 202 is proximal (close) to the imaging device, the method 400 may determine an appropriate zoom level (i.e., magnification) to use to show the user as apparently close to the apparatus 204 and if the user 202 is distal to (further away from) the imaging device, the method 400 may determine an appropriate zoom level to use to show the user as apparently further away from the apparatus 204.

In another example, the zoom level may be set according to the distance between the user's face and the imaging device so that the user's face is shown on the display of the apparatus 204 at a certain size (e.g., the user's face may be shown as the same size on the display irrespective of how away the user is from the imaging device).

The resolution of the display may be a factor in determining the zoom level. For example, if the display has a high resolution, the zoom level may be set to provide a large magnification without distorting or pixelating the image seen by the user 202. However, if the display has a low resolution, the zoom level may provide less magnification to reduce distorting or pixelating the image seen by the user 202.

In some embodiments, at block 410, the method 400 comprises determining a first specified zoom level (e.g., a 'baseline zoom level') to be used to ensure that the user's face is displayed in full on the display. This first specified zoom level may be based on a dimension of the user's face, a distance between the user's face and an imaging device for acquiring the imaging data and/or a resolution of the display. The first specified zoom level may not be the normal zoom level seen in a 'selfie camera' image but may be a magnified zoom level (although this may depend on the distance between the user's face and the imaging device). The first specified zoom level may be calculated to be a certain ratio (e.g. 1.7 factor) to the user's actual facial dimensions and may also take into account the display resolution.

The method 400 further comprises, at block 410, determining a second, increased, specified zoom level (e.g., an 'area zoom level' or 'magnified zoom level' as referred to above) to be used to show at least the portion of the user's face upon identifying that the user 202 has performed the specified facial gesture. The second specified zoom level may be calculated with a constant factor (relative to the first specified zoom level) and may be dependent on the resolution of the display.

In some embodiments, the first and/or second specified zoom levels are calculated based on a resolution of the display and/or a specified fill factor defining a proportional area of the display to be used for displaying the user's face at the first and second specified zoom levels, such that an image quality metric is met for displaying the user's face on the display at both the first and second specified zoom levels.

A proportional area of the display may refer to how much of the display area is used to display the user's face.

An example image quality metric may be a minimum resolution for displaying a portion of the user's face. Where digital zoom is used, the resolution may be decreased when the portion is magnified. In an example, the image quality metric may be met providing the portion of the user's face is displayed at least at the minimum resolution at both the first and second specified zoom levels. Thus, the first and second specified zoom levels may be selected to avoid zooming in too far, which may be associated with the image quality metric no longer being met.

In an example, the method 400 may ensure that a certain proportion of the display is used for showing the user's face. For example, a first proportion (e.g., between 60% to 90% or any other appropriate range) of the display width and/or height may be used for showing the user's face (e.g., when at the first specified zoom level) and a second, higher, proportion (e.g., between 70% and 100% or any other appropriate range) of the display width and/or height may be used for showing the user's face (e.g., when at the second specified zoom level). If 100% of the display's height and/or width is used, this may imply that not all of the user's face is visible because the specified zoom level is too high and/or the display is too small to show the entire user's face at the specified zoom level.

A ratio between the first and second zoom levels may refer to the ratio of the second proportion to the first proportion. As already discussed, the zoom level to be used may depend on the display resolution to avoid a distortion or 'pixelated' effect being seen by the user 202 or, in other words, to ensure that the image quality metric is met.

Once the first and second specified zoom levels have been determined, the method 400 proceeds to block 412 where the display is caused to show the user at the first specified zoom level. This may enable the user 202 to initially see their entire face in the display.

A measurement may then be performed at block 414 of the method 400 to determine the user's facial position relative to the display (i.e., based on the orientation of the user's head as observed by the imaging device). In this example, this measurement may involve determining the yaw and/or pitch of the user's head. As mentioned previously, facial landmark detection may be used to track the user's facial movement from the imaging data.

If the measurement is determined to be not successful at block 416 of the method 400, the method 400 proceeds to block 418 where a determination is made as to whether or not the present zoom level corresponds to the second specified zoom level. If not, the method 400 returns to block 414. If yes, the method 400 proceeds to block 420 which delays a return to the first specified zoom level at block 412. Thus, if the method 400 is unable to determine the user's present facial position relative to the display and the present zoom level is the second specified zoom level, the method 400 may cause the display to return to the first specified zoom level. The delay may be of order 500 ms or another appropriate delay to avoid the user 202 becoming disoriented by the change in zoom level.

In some examples, the change in zoom level may be instantaneous (e.g., by abruptly changing between the first and second specified zoom levels) or may be smooth (e.g., by slowly changing between the first and second specified zoom levels).

If the measurement is determined to be successful at block 416 of the method 400, the method 400 proceeds to block 422 to determine whether or not the user's facial position corresponds to a specified facial gesture. In this example, block 422 determines if the yaw and/or pitch of the user's face relative to the baseline facial position equals or exceeds a threshold. If not, the method 400 proceeds to block 418. If yes, the method 400 proceeds to block 424 to determine whether or not the present zoom level is at the second specified zoom level. If yes, the method 400 proceeds to block 414. In other similar words, if the user 202 has performed the specified facial gesture and the present zoom level is set at the second specified zoom level, the method 400 continues to check the user's facial position to ensure that the present zoom level should still be maintained at the second specified zoom level.

If a determination is made at block 424 that the present zoom level is at the first specified zoom level, the method 400 proceeds to block 426 where the zoom level is changed, with a delay to reduce user disorientation, to the second specified zoom level. In other similar words, if the user 202 has performed a specified facial gesture indicative that the zoom level should be increased (e.g., by moving their head beyond the threshold), the display then shows at least a portion of the user's face at the second specified zoom level.

The method 400 then proceeds to block 428 where face detection is performed (e.g., using face landmark detection) and then to block 430 to determine whether or not a face is detected. If yes, the method 400 proceeds to block 414. In other similar words, if the user 202 has performed the specified facial gesture, the present zoom level is set at the second specified zoom level and the user's face can still be detected, the method 400 continues to check the user's facial position to determine whether or not the present zoom level should still be maintained at the second specified zoom level. If no, the method 400 proceeds to block 402 in order to re-establish detection of the user's face. This involves returning to the first specified zoom level at block 412 before re-establishing whether or not the user 202 has made a specified facial gesture.

In some embodiments, identifying the specified facial gesture from imaging data of the user comprises tracking a position of the user's face relative to a reference point or axis to determine whether or not the user has performed the specified facial gesture. For example, the reference point or axis may be defined by the user's face being in the baseline facial position.

In some embodiments, tracking the position of the user's face relative to the reference point or axis comprises comparing a distance between a facial landmark and the reference point and/or an orientation of the user's head relative to the reference axis with a threshold indicative of a change to the specified zoom level to be used. In the method 400, block 422 refers to a threshold yaw and/or pitch of the user's head. Thus, the comparison with the threshold may indicate that the specified zoom level is to be changed. For example, if the present zoom level is to change because the user's head orientation is detected to have crossed the threshold, the method 400 may proceed via blocks 418, 420 to 412 (i.e., to zoom out after previously being zoomed in) or via blocks 424 to 426 (i.e., to zoom in after previously being zoomed out).

In some embodiments, the threshold for the orientation of the user's head is between 1 and 45 degrees for user's head yaw and between 1 and 45 degrees for the user's head pitch. In an example, the threshold for the orientation of the user's head is between 10 and 20 degrees (e.g., 15 degrees) for user's head yaw and between 20 and 30 degrees (e.g., 25 degrees) for the user's head pitch. It has been found that these example values for the threshold yaw and pitch may represent the point where the user finds it more difficult to see parts of their face. For the avoidance of doubt, the threshold values may be above and below 0 degrees. For example, relative to the baseline facial position (at 0 degrees tilt and yaw), the threshold may be set at ±15 degrees for the user's head yaw and ±25 degrees for the user's head tilt.

So, for example, a user's head yaw being below 15 degrees and/or head pitch being below 25 degrees may mean that the user can adequately see their face in the display at the first specified zoom level. However, if the user's head yaw is equal to or above 15 degrees and/or their head pitch is equal to or above 25 degrees, this may mean that the user may not be able to adequately or easily see at least a portion of their face in the display unless the display shows the portion at the second specified zoom level. Accordingly, by zooming to the second specified zoom level, the user may more easily be able to see at least the portion of their face.

In some embodiments, determining the specified zoom level comprises determining whether or not a change in position of the user's face relative to the reference point or axis corresponds to the specified facial gesture indicative of the specified zoom level to be used.

In some embodiments, the reference point or axis corresponds to a: baseline yaw of the user's head, baseline pitch of the user's head and/or baseline lateral offset of the user's head relative to an axis (e.g., axis 210) defined between the user's head and the display or an imaging device for acquiring the imaging data. In other similar words, if the user's facial position corresponds to the baseline facial position, this may define the reference point or axis.

In some embodiments, the specified facial gesture comprises a change in yaw, pitch and/or lateral offset of the user's head relative to the baseline yaw, baseline pitch and/or baseline lateral offset, respectively. In method 400, this may refer to block 422 where a determination is made as to whether or not the user's head yaw and/or pitch crosses the threshold. In some examples, other facial gestures may be taken into account such as head roll and/or facial expressions.

In some embodiments, determining the specified zoom level to be used is based on the change in yaw, pitch and/or lateral offset of the user's head, and wherein the specified zoom level to be used: changes continuously (or smoothly) depending on a difference between the yaw, pitch and/or lateral offset of the user's head relative to the baseline yaw, baseline pitch and/or baseline lateral offset, respectively; or changes abruptly upon a difference between the yaw, pitch and/or lateral offset of the user's head relative to the baseline yaw, baseline pitch and/or baseline lateral offset, respectively, crossing a threshold value. Where the specified zoom level changes continuously or smoothly, this may imply that there are more than two specified zoom levels so that as the user rotates their head, the zoom level changes according to this rotation. Where the specified zoom level changes abruptly, the zoom level may stay the same until a threshold is crossed whereupon the zoom level changes.

A combination of continuous and abrupt zoom level changes may be used. For example, for a certain range of head yaw and pitch (e.g., below the threshold), there may be no change in zoom level (e.g., the present zoom level may be maintained at the first specified zoom level) and, at the threshold, the present zoom level may abruptly change to the second specified zoom level. For any further rotation of the user's head beyond the threshold, the zoom level may increase further than the second specified zoom level (e.g., with greater magnification) as the user increases their head yaw and/or pitch relative to the baseline facial position. So, as the yaw and/or pitch increases and the visibility of the portion of the user's face decreases, the greater magnification (beyond the second specified zoom level) may assist the user with their personal care activity.

In some embodiments, the method 400 comprises causing the display showing the video feed of the user's face to show at least the portion of the user's face at the specified zoom level (e.g., block 106 of the method 100) comprises determining, based on the identified specified facial gesture, that one of: the first and second specified zoom level is to be used instead of the other of: the first and second specified zoom level, and causing the display to show at least the portion of the user's face at the first or second specified zoom level to be used after a time delay. As shown by FIG. 4, a determination may be made that a different zoom level is to be used at block 418 or 424.

Figure 5:
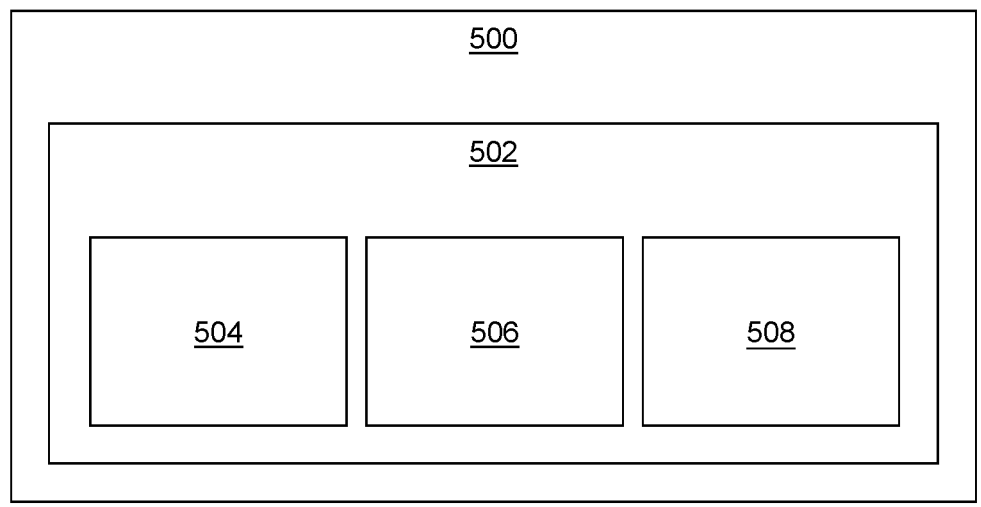
FIG. 5 is a schematic drawing of an apparatus for determining a display zoom level according to an embodiment.

FIG. 5 shows an apparatus 500 comprising processing circuitry 502, which may be used for implementing certain methods described herein such as the method 100 and/or the method 400. The apparatus 500 may comprise modules with functionality corresponding to the features described in relation to the system 200 of FIG. 2 such as the processing circuitry 206 thereof.

The processing circuitry 502 comprises an identification module 504 configured to identify a specified facial gesture from imaging data of a user (e.g., corresponding to block 102 of the method 100).

The processing circuitry 502 further comprises a determining module 506 configured to determine whether the specified facial gesture is indicative of a specified zoom level to be used for displaying the user's face (e.g., corresponding to block 104 of the method 100).

The processing circuitry 502 further comprises a control module 508 configured to, in response to a determination being made that the specified zoom level is to be used instead of a previously-determined zoom level used for displaying the user's face, cause a display showing a video feed of the user's face to change a displayed size of at least a portion of the user's face on the video feed based on a difference between the specified zoom level and the previously-determined zoom level (e.g., corresponding to block 106 of the method 100).

Figure 6:
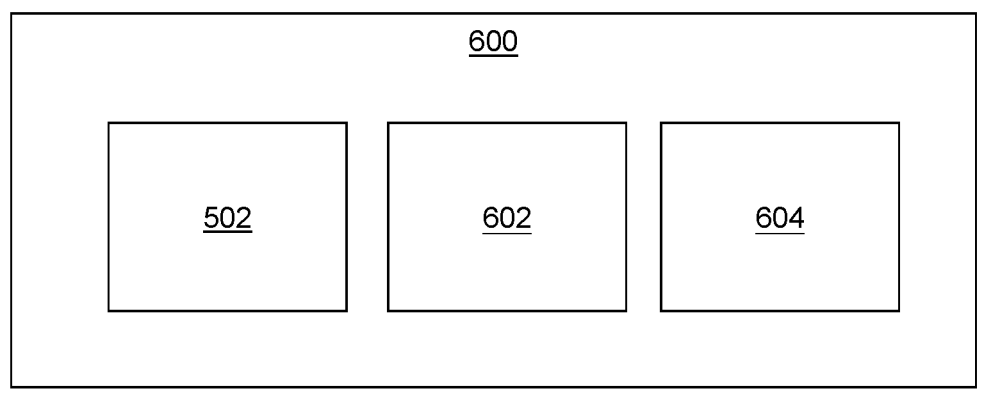
FIG. 6 is a schematic drawing of an apparatus for determining a display zoom level according to an embodiment.

FIG. 6 shows an apparatus 600, which may be used for implementing certain methods described herein such as the method 100 and/or the method 400. The apparatus 600 may comprise modules with functionality corresponding to the features described in relation to the system 200 of FIG. 2 such as the processing circuitry 206 thereof and/or the apparatus 500 of FIG. 5. The apparatus 600 comprises the processing circuitry 502 of FIG. 5.

In some embodiments, the apparatus 600 further comprises a display 602 (e.g., of the apparatus 204) and/or an imaging device 604 (e.g., of the apparatus 204) for acquiring the imaging data. Thus, apparatus 600 of these embodiments may correspond to the apparatus 204 of FIG. 2 or any other apparatus described herein. Since the apparatus 600 comprises the processing circuitry 502, certain methods described herein may be implemented by the apparatus 600 itself instead of using a server or cloud-based service to implement such methods (as discussed in relation to certain other embodiments).

In some cases, any of the modules described above (e.g., the identification module 504, the determining module 506 and/or the control module 508) may comprise at least one dedicated processor (e.g., an application specific integrated circuit (ASIC) and/or field programmable gate array (FPGA), etc) for implementing the functionality of the module.

In some cases, the module (e.g., the identification module 504, the determining module 506 and/or the control module 508) may comprise at least one processor for implementing instructions which cause the at least one processor to implement the functionality of the module described above. In such examples, the instructions may be stored in a machine-readable medium (not shown) accessible to the at least one processor. In some examples, the module itself comprises the machine-readable medium. In some examples, the machine-readable medium may be separate to the module itself (e.g., the at least one processor of the module may be provided in communication with the machine readable medium to access the instructions stored therein).

Figure 7:
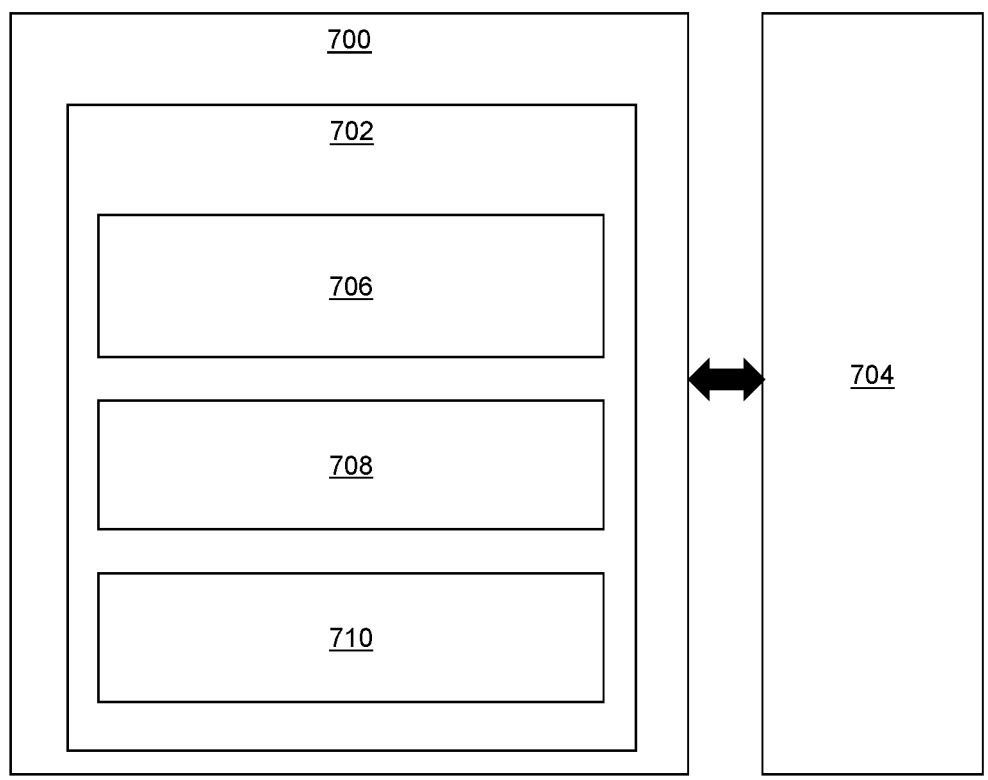
FIG. 7 is a schematic drawing of a machine-readable medium for determining a display zoom level according to an embodiment.

FIG. 7 shows a tangible machine-readable medium 700 storing instructions 702 which, when executed by at least one processor 704, cause the at least one processor 704 to implement certain methods described herein (such as the method 100 and/or the method 400).

In FIG. 7, the instructions 702 comprise instructions 706 to identify a specified facial gesture from imaging data of a user (e.g., corresponding to block 102 of the method 100).

The instructions 702 further comprise instructions 708 to determine whether the specified facial gesture is indicative of a specified zoom level to be used for displaying the user's face (e.g., corresponding to block 104 of the method 100).

The instructions 702 further comprise instructions 710 to, in response to a determination being made that the specified zoom level is to be used instead of a previously-determined zoom level used for displaying the user's face, cause a display showing a video feed of the user's face to change a displayed size of at least a portion of the user's face on the video feed based on a difference between the specified zoom level and the previously-determined zoom level (e.g., corresponding to block 106 of the method 100).

One or more features described in one embodiment may be combined with or replace features described in another embodiment. For example, the methods 100 and 400 of FIGS. 1 and 4 may be modified based on features described in relation to the system 200, apparatus 400, 500 of FIGS. 2, 4 and 5, and vice versa.

Although certain embodiments described herein refer to certain facial gestures to control the zoom level to be used, different facial gestures may be used instead of yaw/pitch. For example, user head roll, lateral offset and/or any other facial expressions may be used to automatically control the zoom level to be used by the display. Embodiments described herein may be implemented on any display type, e.g., including flat and curved (e.g., concave) displays.

Although certain embodiments refer to first and second specified zoom levels, more than two zoom levels may be implemented by embodiments described herein if appropriate.

This disclosure includes subject-matter defined by the following numbered paragraphs:

Paragraph 1. A computer-implemented method, comprising:
identifying a specified facial gesture from imaging data of a user;
determining a specified zoom level to be used for displaying the user's face based on the specified facial gesture; and
causing a display showing a video feed of the user's face to show at least a portion of the user's face at the specified zoom level.

Paragraph 2. The method of paragraph 1, wherein identifying the specified facial gesture from imaging data of the user comprises tracking a position of the user's face relative to a reference point or axis to determine whether or not the user has performed the specified facial gesture.

Paragraph 3. The method of paragraph 2, wherein tracking the position of the user's face relative to the reference point or axis comprises comparing: a distance between a facial landmark and the reference point and/or an orientation of the user's head relative to the reference axis with a threshold indicative of a change to the specified zoom level to be used.

Paragraph 4. The method of paragraph 3, wherein the threshold for the orientation of the user's head is between 1 and 45 degrees for user's head yaw and between 1 and 45 degrees for the user's head pitch.

Paragraph 5. The method of paragraph 2, 3 or 4, wherein determining the specified zoom level comprises determining whether or not a change in position of the user's face relative to the reference point or axis corresponds to the specified facial gesture indicative of the specified zoom level to be used.

Paragraph 6. The method of any of paragraphs 2 to 5, wherein the reference point or axis is based on the user's head having zero yaw, pitch and/or offset relative to the display and/or an imaging device for acquiring the imaging data.

Paragraph 7. The method of any preceding paragraph, wherein the specified facial gesture comprises a change in yaw, pitch and/or offset of the user's head relative to the display and/or an imaging device for acquiring the imaging data.

Paragraph 8. The method of paragraph 7, wherein determining the specified zoom level to be used is based on the change in yaw, pitch and/or offset of the user's head, and wherein the specified zoom level to be used one of: changes continuously depending on the yaw, pitch and/or offset of the user's head; or changes abruptly upon the yaw, pitch and/or offset of the user's head crossing a threshold value for the yaw, pitch and/or offset of the user's head.

Paragraph 9. The method of any preceding paragraph, comprising determining:
   a first specified zoom level to be used to ensure that the user's face is displayed in full on the display based on a dimension of the user's face, a distance between the user's face and an imaging device for acquiring the imaging data and/or a resolution of the display; and
   a second, increased, specified zoom level to be used to show at least the portion of the user's face upon identifying that the user has performed the specified facial gesture.

Paragraph 10. The method of paragraph 9, wherein a ratio between the first and second specified zoom levels is calculated based on a resolution of the display and/or a specified fill factor for the dimension of the portion of the user's face with respect to a dimension of the display.

Paragraph 11. The method of paragraph 9 or 10, wherein causing the display showing the video feed of the user's face to show at least the portion of the user's face at the specified zoom level comprises determining that one of the first and second specified zoom level is to be used instead of the other of the first and second specified zoom level, and causing the display to show at least the portion of the user's face at the first or second specified zoom level to be used after a time delay.

Paragraph 12. The method of any preceding paragraph, further comprising causing an imaging device to acquire the imaging data.

Paragraph 13. A tangible machine-readable medium storing instructions which, when executed by at least one processor, cause the at least one processor to implement the method according to any preceding paragraph.

Paragraph 14. Apparatus comprising processing circuitry, the processing circuitry comprising:
   an identification module to identify a specified facial gesture from imaging data of a user;
   a determining module to determine a specified zoom level to be used for displaying the user's face based on the specified facial gesture; and
   a control module to cause a display showing a video feed of the user's face to show at least a portion of the user's face at the specified zoom level.

Paragraph 15. The apparatus of paragraph 14, further comprising the display and/or an imaging device for acquiring the imaging data.

Embodiments in the present disclosure can be provided as methods, systems or as a combination of machine readable instructions and processing circuitry. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to embodiments of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules of the apparatus 500, 600 (for example, the identification module 504, determining module 506 and/or control module 508) and other devices described herein may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the embodiments of the present disclosure.

Elements or steps described in relation to one embodiment may be combined with or replaced by elements or steps described in relation to another embodiment. Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together

The invention claimed is:

1. A computer-implemented method, comprising:
identifying a specified facial gesture from imaging data of a face of a user;
determining whether the specified facial gesture is indicative of a specified zoom level to be used for displaying the user's face; and
in response to determining that the specified zoom level is to be used instead of a previously-determined zoom level used for displaying the user's face, causing a display showing a video feed of the user's face to change a displayed size of at least a portion of the user's face on the video feed based on a difference between the specified zoom level and the previously-determined zoom level,
wherein identifying the specified facial gesture from imaging data of the user comprises tracking a position of the user's face relative to a reference point or a reference axis to determine whether the user has performed the specified facial gesture, and wherein tracking the position of the user's face relative to the reference point or the reference axis comprises comparing a distance between a facial landmark and the reference point and/or an orientation of a head of the user relative to the reference axis with a threshold indicative of a change to the specified zoom level to be used.

2. The method of claim 1, wherein the threshold for the orientation of the user's head is between 1 and 45 degrees for yaw of the user's head and between 1 and 45 degrees for pitch of the user's head.

3. The method of claim 1, wherein determining the specified zoom level comprises determining whether a change in position of the user's face relative to the reference point or the reference axis corresponds to the specified facial gesture indicative of the specified zoom level to be used.

4. The method of claim 1, wherein the reference point or the reference axis corresponds to:
a baseline yaw of the user's head;
a baseline pitch of the user's head; and/or
a baseline lateral offset of the user's head relative to an axis defined between the user's head and the display or an imaging device for acquiring the imaging data.

5. The method of claim 1, further comprising causing an imaging device to acquire the imaging data.

6. A tangible, non-transitory machine-readable medium storing instructions that, when executed by at least one processor, cause the at least one processor to implement the method according to claim 1.

7. A computer-implemented method, comprising:
identifying a specified facial gesture from imaging data of a face of a user;
determining whether the specified facial gesture is indicative of a specified zoom level to be used for displaying the user's face;
in response to determining that the specified zoom level is to be used instead of a previously-determined zoom level used for displaying the user's face, causing a display showing a video feed of the user's face to change a displayed size of at least a portion of the user's face on the video feed based on a difference between the specified zoom level and the previously-determined zoom level;
determining a first specified zoom level to be used to ensure that the user's face is displayed in full on the display based on a dimension of the user's face, a distance between the user's face and an imaging device for acquiring the imaging data and/or a resolution of the display; and
determining a second, increased, specified zoom level to be used to show at least the portion of the user's face upon identifying that the user has performed the specified facial gesture.

8. The method of claim 7, wherein identifying the specified facial gesture from the imaging data comprises identifying an orientation of a head of the user relative to a baseline orientation, and wherein the identified orientation is indicative of the specified zoom level to be used.

9. The method of claim 7, wherein identifying the specified facial gesture from imaging data of the user comprises tracking a position of the user's face relative to a reference point or a reference axis to determine whether the user has performed the specified facial gesture, and wherein tracking the position of the user's face relative to the reference point or the reference axis comprises comparing a distance between a facial landmark and the reference point and/or an orientation of a head of the user relative to the reference axis with a threshold indicative of a change to the specified zoom level to be used.

10. The method of claim 9, wherein the threshold for the orientation of the user's head is between 1 and 45 degrees for yaw of the user's head and between 1 and 45 degrees for pitch of the user's head.

11. The method of claim 9, wherein determining the specified zoom level comprises determining whether a change in position of the user's face relative to the reference point or the reference axis corresponds to the specified facial gesture indicative of the specified zoom level to be used.

12. The method of claim 9, wherein the reference point or the reference axis corresponds to:
a baseline yaw of the user's head;
a baseline pitch of the user's head; and/or
a baseline lateral offset of the user's head relative to an axis defined between the user's head and the display or an imaging device for acquiring the imaging data.

13. The method of claim 7, wherein the specified facial gesture comprises a change in yaw, pitch and/or lateral offset of a head of the user relative to baseline yaw, baseline pitch and/or baseline lateral offset, respectively.

14. The method of claim 13, wherein determining the specified zoom level to be used is based on the change in yaw, pitch and/or lateral offset of the user's head, and wherein the specified zoom level to be used:
changes continuously depending on a difference between the yaw, pitch and/or lateral offset of the user's head relative to the baseline yaw, baseline pitch and/or baseline lateral offset, respectively; or
changes abruptly upon a difference between the yaw, pitch and/or lateral offset of the user's head relative to the baseline yaw, baseline pitch and/or baseline lateral offset, respectively, crossing a threshold value.

15. The method of claim 7, wherein the first and/or second specified zoom levels are calculated based on a resolution of the display and/or a specified fill factor defining a proportional area of the display to be used for displaying the user's face at the first and second specified zoom levels, such that an image quality metric is met for displaying the user's face on the display at both the first and second specified zoom levels.

16. The method of claim 7, wherein causing the display showing the video feed of the user's face to show at least the portion of the user's face at the specified zoom level comprises:

determining, based on the identified specified facial gesture, that one of the first specified zoom level or the second specified zoom level is to be used instead of the other of the first specified zoom level or the second specified zoom level; and causing the display to show at least the portion of the user's face at the determined first or second specified zoom level to be used after a time delay.

17. An apparatus comprising:

processing circuitry; and non-transitory memory storing instructions that, when executed by the processing circuitry, cause the processing circuitry to:

to identify a specified facial gesture from imaging data of a face of a user;

determine whether the specified facial gesture is indicative of a specified zoom level to be used for displaying the user's face;

in response to a determination being made that the specified zoom level is to be used instead of a previously-determined zoom level used for displaying the user's face, cause a display showing a video feed of the user's face to change a displayed size of at least a portion of the user's face on the video feed based on a difference between the specified zoom level and the previously-determined zoom level;

determine a first specified zoom level to be used to ensure that the user's face is displayed in full on the display based on a dimension of the user's face, a distance between the user's face and an imaging device for acquiring the imaging data and/or a resolution of the display; and determine a second, increased, specified zoom level to be used to show at least the portion of the user's face upon identifying that the user has performed the specified facial gesture.

18. The apparatus of claim 17, further comprising the display and/or an imaging device for acquiring the imaging data.

19. The apparatus of claim 17, wherein the first and/or second specified zoom levels are calculated based on a resolution of the display and/or a specified fill factor defining a proportional area of the display to be used for displaying the user's face at the first and second specified zoom levels, such that an image quality metric is met for displaying the user's face on the display at both the first and second specified zoom levels.

20. The apparatus of claim 17, wherein the processing circuitry causes the display showing the video feed of the user's face to show at least the portion of the user's face at the specified zoom level by:

determining, based on the identified specified facial gesture, that one of the first specified zoom level or the second specified zoom level is to be used instead of the other of the first specified zoom level or the second specified zoom level; and causing the display to show at least the portion of the user's face at the determined first or second specified zoom level to be used after a time delay.

\* \* \* \* \*